A. P. CHRISTENSEN.
AEROPLANE CONSTRUCTION AND THE LIKE.
APPLICATION FILED SEPT. 12, 1916.
1,244,470.
Patented Oct. 30, 1917.
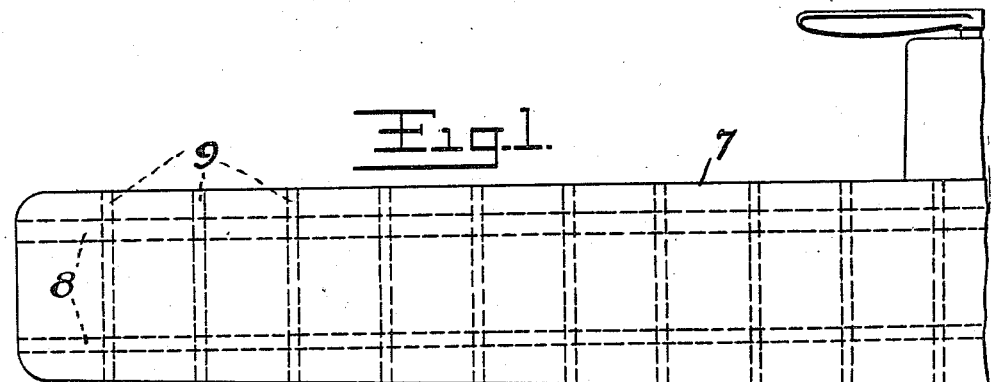
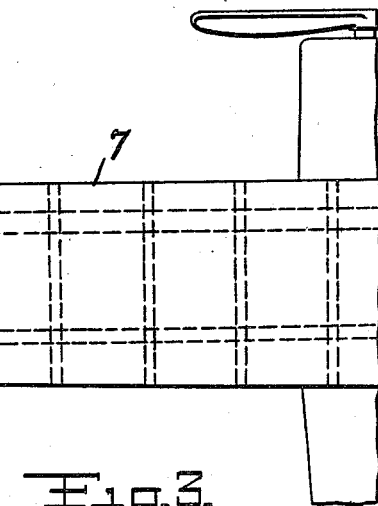
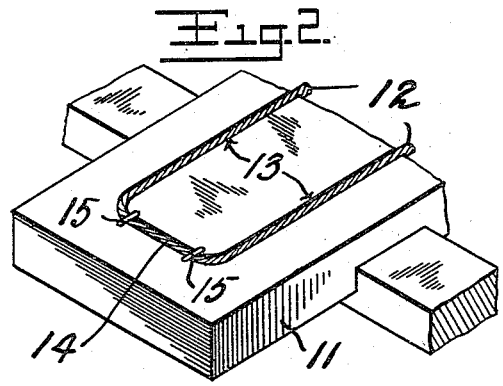
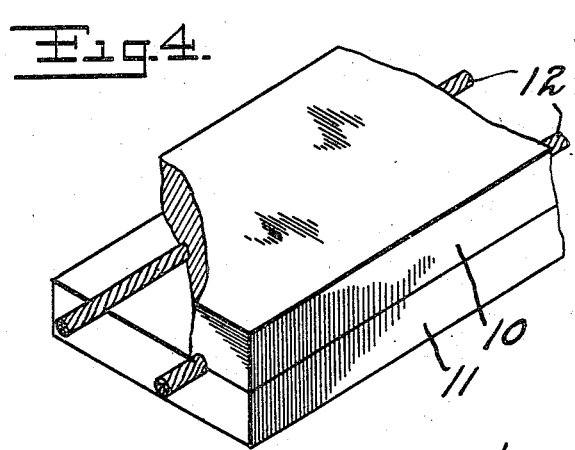
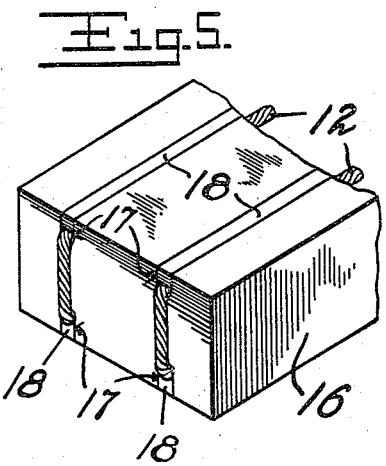
Anders P. Christensen, Inventor
By his Attorney
Frank J. Kent

UNITED STATES PATENT OFFICE.

ANDERS P. CHRISTENSEN, OF HEMPSTEAD, NEW YORK.

AEROPLANE CONSTRUCTION AND THE LIKE.

1,244,470.  Specification of Letters Patent.  Patented Oct. 30, 1917.

Application filed September 12, 1916. Serial No. 119,610.

*To all whom it may concern:*

Be it known that I, ANDERS P. CHRISTENSEN, a subject of the King of Denmark, residing at Hempstead, in the county of Nassau and State of New York, have invented certain new and useful Improvements in Aeroplane Construction and the like, of which the following is a specification.

This invention relates to beams and struts used for various structural purposes, the general objects of the invention being to provide a strut of relatively great strength but light weight and therefore particularly adapted for use in aeroplanes.

Other objects are to brace a strut against breakage from bending strains and to reinforce it against collapse when weakened as being pierced by projectiles.

Further objects are to accomplish the foregoing without adding to the bulk or wind resistance of the strut.

These objects I have accomplished by constructing the strut in laminations interposing between the laminations a flexible cable reinforcement. In a preferred form this cable is doubled upon itself in a continuous loop.

In the accompanying drawing I have illustrated the invention embodied in several practical forms, wherein:

Figure 1 is a fragmentary plan view of an aeroplane wing having my invention incorporated therein;

Fig. 2 is an enlarged broken perspective view of one of the struts, with the top lamination removed to expose the reinforcing cable which is normally concealed between the laminations;

Fig. 3 is a cross sectional view of one of the struts;

Fig. 4 is a broken perspective view of a form where the cable ends extend beyond the end of the laminations; and Fig. 5 is a similar view of another form wherein the cables are set in grooves in one member and are covered over by laminations in the nature of filler strips.

The aeroplane wing 7, shown in Fig. 1 is made up of longitudinal preferably wood struts 8, connected by cross struts 9.

The construction of these struts is clearly illustrated in Figs. 2 and 3, they being there shown made up of top and bottom laminations 10 and 11, the grain of the wood preferably running lengthwise, glued or otherwise suitably secured together and having interposed between them lengths of longitudinally extending cable 12, preferably made of braided steel wire, said cable being shown seated in channels 13 provided by complementary grooves or recesses formed in the meeting faces of the two parts. Instead of a cable, wire may be used.

In this first form the cable is in the nature of an endless loop, with the two longitudinal stretches of cable laid near the edges of the strut and connected at the ends by portions 14, which may, for greater security, be stapled in place, as indicated at 15.

In this construction the cable is wholly concealed within the strut and so offers no wind resistance, a feature of considerable importance in aeroplanes. Further, the braided nature of the cable has the advantage that because the glue takes a good grip on the cable, slipping of the latter longitudinally in the groove or along the face of the strut is prevented.

In the form shown in Fig. 4, the cables are extended beyond the end of the strut and so can be used for fastening or anchorage purposes, or the like.

In Fig. 5 the strut is made up of a main body portion 16, formed with grooves 17, in which the cables are seated, said grooves being closed by cover strips or laminations 18. In this form also each cable extends from one face portion of the strut body, across the end to the opposite face portion thereof. This is a more rigid structure than those above described.

My invention adds great tensile strength without increasing the bulk or materially affecting the weight. The embedded cables also form in effect, trusses, bracing the strut against transverse fractures. This is particularly important in aeroplanes as the truss effect is sufficient to counteract the weakening occasioned by the piercing of the strut by projectiles, etc. Where a degree of flexibility is desired, this may be provided for by seating the cables in place under varying degrees of tension, a less tension, allowing for a greater degree of flexibility in the finished strut. It is evident also that the invention may be applied advantageously to but the face of a strut. In other words, I conceive that my broad invention lies in providing a strut or like member with a reinforce in the nature of a cable, or flexible filament or strand.

What I claim as new and desire to secure by Letters Patent is:

1. A strut comprising a strut member provided with grooves in opposite faces thereof, a cable seated in the groove in one face and looped across the end and seated in the groove in the opposite face of the member and strips covering the cable laid in said grooves.

2. A strut comprising a strut member provided with grooves in opposite faces thereof, a cable seated in the groove in one face and looped across and seated in the groove in the opposite face of the member.

3. A strut member provided with grooves in opposite faces thereof, lengths of cable seated in said grooves and strips fitting within the grooves and covering the cable within the same.

4. A strut member provided with grooves in opposite faces thereof, reinforcing members seated within the grooves and means fitting within the grooves for covering the reinforcing members within the same.

5. A strut member provided with grooves in opposite faces thereof, a length of cable seated in the groove in one face and looped across one end of the strut and seated in the groove in the opposite face, the ends of said cable being connected together at the opposite end of the strut.

In testimony whereof I affix my signature.

ANDERS P. CHRISTENSEN.